Feb. 23, 1937.    J. NAGELE    2,071,650
COMBINED CAN BAIL AND OPENER
Filed Jan. 7, 1936
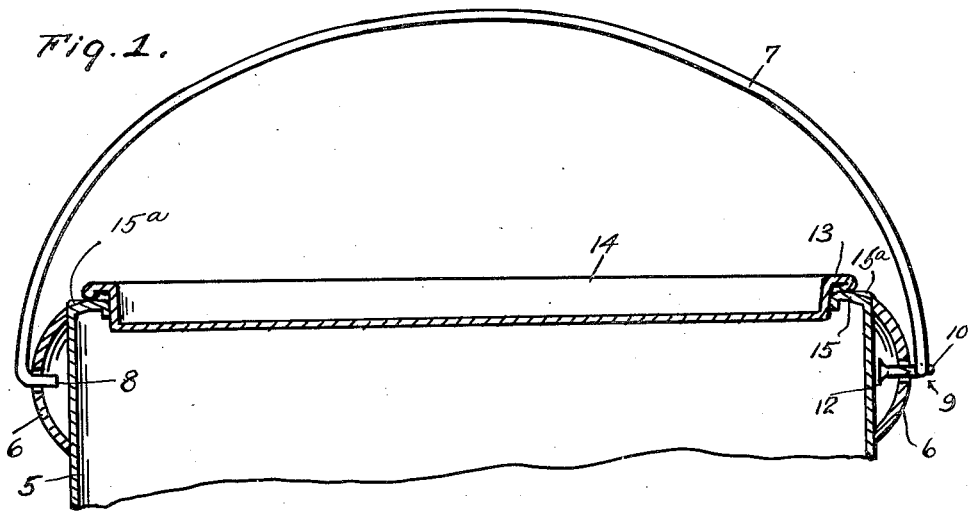
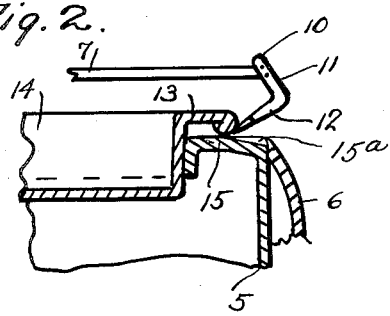
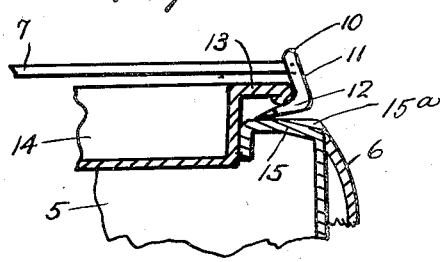
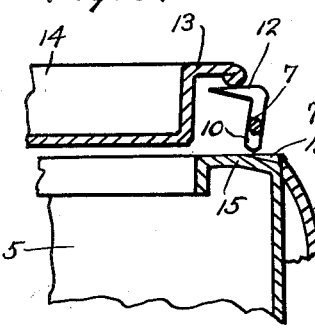
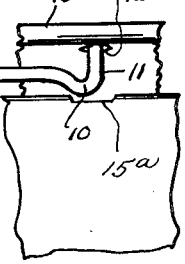
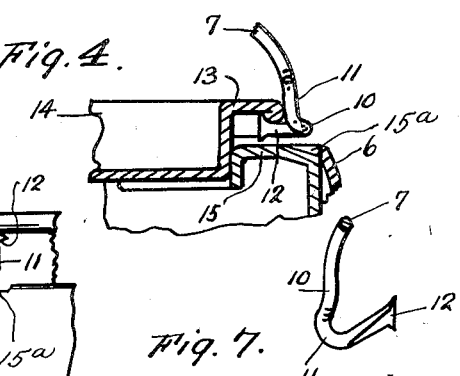
Inventor
J. Nagele
By Clarence A. O'Brien and
Hyman Berman
Attorneys Patented Feb. 23, 1937

2,071,650

UNITED STATES PATENT OFFICE 2,071,650

COMBINED CAN BAIL AND OPENER

Joseph Nagele, Sheldon, Ill.

Application January 7, 1936, Serial No. 57,989

1 Claim. (Cl. 220—43)

This invention appertains to new and useful improvements in metallic receptacles and more particularly to a combination can carrying bail and opener.

The principal object of the present invention is to provide a can structure including a bail and wherein the bail is constructed at one end in such a manner that the same can be disconnected from the can and engaged with the lid of the can and actuated so that the same end acts as a cam to open the lid.

Other important objects and advantages of the invention will become apparent to the reader of the following specification.

In the drawing:

Figure 1 represents a fragmentary vertical sectional view through the upper portion of a can.

Figure 2 represents a fragmentary vertical sectional view showing the opener end of the bail engaged with the lid.

Figure 3 represents a vertical fragmentary sectional view showing the opener end engaged under the lid.

Figure 4 is a fragmentary vertical sectional view showing the bail turned in like ways and the cam having lifted the lid somewhat.

Figure 5 is a fragmentary vertical sectional view with the cam having entirely lifted the lid.

Figure 6 represents a fragmentary side elevational view of the structure shown in Figure 5 with the lid entirely lifted.

Figure 7 represents a fragmentary perspective view of the opener end of the bail.

Referring to the drawing wherein like numerals designate like parts, it can be seen that numeral 5 represents the can, such as is used for syrup and other products, with numeral 6 representing the perforated ear with which the bail 7 is engaged. One end of the bail 7 is provided with the inwardly disposed pintle 8 for engaging into one of the ears 6, while the other end of the bail 7 is provided with the opener generally referred to by numeral 9. This opener consists of an outwardly curved goose neck portion 10 which is bent backwardly as at 11 and then laterally to provide the claw 12 which is of tapering construction.

It can be seen, that in operation, the opener end 9 is disengaged from its corresponding ear 6 and placed against the flange 13 of the slip type lid 14. The claw 12 is now driven under the flange 13 to assume the position shown in Figure 3. The bail is in lowered position during this operation, and now by lifting upwardly on the bail, the cam or goose neck portion 10 rides on the rim 15 of the cam resulting in the lifting of the claw 12 by cam action and the elevation of the lid 14 until when the bent end 11 of bail is in complete upright position the cam has lifted the claw 12 so as to completely lift the lid 14 in the manner shown in Figure 5.

As can be seen in the drawing, where the claw 12 is to engage under the flange of the lid 14, a shallow depression 15a is provided in the inturned flange portion 15 of the can 5. This facilitates insertion of the claw under the flange of the lid.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

In combination with a can having a slip type lid, a bail, said bail being swingably connected to one end to the can, the other end of the bail being detachably connected to the can and provided with a laterally disposed tapering claw, said bail adjacent the claw being provided with a cam-acting offset disposed at right angles to the claw.

JOSEPH NAGELE.